United States Patent [19]
Diaz et al.

[11] Patent Number: 5,212,285
[45] Date of Patent: May 18, 1993

[54] REMOVAL OF HYDROGENATION CATALYST FROM POLYMER SOLUTIONS BY CATALYZED PRECIPITATION

[75] Inventors: Zaida Diaz; Carma J. Gibler, both of Houston, Tex.

[73] Assignee: Shell Oil Company, Houston, Tex.

[21] Appl. No.: 537,738

[22] Filed: Jun. 14, 1990

[51] Int. Cl.$^5$ ................................................ C08F 6/08
[52] U.S. Cl. ................................... 528/482; 528/492; 210/729
[58] Field of Search ............... 528/492, 482; 210/729, 210/688

[56] References Cited

U.S. PATENT DOCUMENTS

| | | | |
|---|---|---|---|
| 2,893,982 | 7/1959 | Campbell | 260/85.1 |
| 3,023,201 | 2/1962 | Moberly et al. | 260/94.7 |
| 3,531,448 | 9/1970 | Johnson | 260/85.1 |
| 3,554,991 | 1/1971 | Griffith | 260/88.7 |
| 3,780,137 | 12/1973 | Hassell | 260/880 B |
| 3,780,138 | 12/1973 | Hassell et al. | 260/880 B |
| 3,793,306 | 2/1974 | Farrar et al. | 260/85.1 |
| 3,793,307 | 2/1974 | DeVault | 260/85.1 |
| 4,016,349 | 4/1977 | McKenna | 528/482 |
| 4,028,485 | 6/1977 | Poloso et al. | 528/486 |
| 4,098,941 | 7/1978 | Johnson | 428/218 |
| 4,098,991 | 7/1978 | Kang | 528/492 |
| 4,278,506 | 7/1981 | Irvin | 203/68 |
| 4,396,761 | 8/1983 | Willis et al. | 528/487 |
| 4,421,874 | 12/1983 | Seefluth | 523/315 |
| 4,423,158 | 12/1983 | Porath | 521/25 |
| 4,471,099 | 9/1984 | Trepka | 525/338 |
| 4,567,251 | 1/1986 | Balas | 528/487 |
| 4,581,431 | 4/1986 | Yamazaki et al. | 528/494 |
| 4,595,749 | 6/1986 | Hoxmeier | 528/483 |

FOREIGN PATENT DOCUMENTS

| | | |
|---|---|---|
| 0186918 | 10/1985 | European Pat. Off. |
| 840477 | 10/1972 | U.S.S.R. |
| 1020720 | 2/1966 | United Kingdom |
| 1444736 | 8/1976 | United Kingdom |

Primary Examiner—Joseph L. Schofer
Assistant Examiner—Tom Weber
Attorney, Agent, or Firm—Donald F. Haas

[57] ABSTRACT

A process is provided comprising the steps of contacting a Group VIII metal hydrogenation catalyst residue containing polymer solution with a chelating resin, the chelating resin comprising iminodiacetate ions, and recovering a polymer solution comprising less than 5 ppm by weight, based on the solution, of the hydrogenation catalyst residue metal. In a preferred embodiment, the chelating resin is contacted with the hydrogenation catalyst residue containing polymer solution by mixing particles of the chelating resin with the hydrogenation catalyst residue containing polymer solution under agitation, and the polymer solution containing less than 5 ppm of hydrogenation catalyst metals is recovered from the chelating resin and resulting precipitated hydrogenation catalyst residues by filtration.

27 Claims, No Drawings ized polymers. More particularly, the invention relates to the removal of residues of hydrogenation catalysts from polymer solutions.

REMOVAL OF HYDROGENATION CATALYST FROM POLYMER SOLUTIONS BY CATALYZED PRECIPITATION

FIELD OF THE INVENTION

This invention relates to a process to prepare hydrogenated polymers. More particularly, the invention relates to the removal of residues of hydrogenation catalysts from polymer solutions.

BACKGROUND OF THE INVENTION

The uses of polymeric materials, including diolefin polymers, continues to grow rapidly in such diverse areas as protective paint coverings, wire insulations, structural panels for automobiles, piping and lubricating oil viscosity index improvers. In many of these applications, the stability of the polymer is of paramount importance. Hydrogenation of diolefin polymers greatly improves the stability of these polymers against oxidative, thermal, and ultraviolet degradation. Polymer hydrogenation processes have therefore been studied for many years as a method to prepare novel materials with excellent stability and other desirable properties. Early polymer hydrogenation processes utilized heterogeneous catalysts which were known to be useful for hydrogenation of low molecular weight olefins and aromatics. These catalyst systems included catalysts such as nickel on kieselguhr. A fine catalyst powder was preferred and large amounts of catalysts were required to complete the hydrogenation in a reasonable time. Such processes were only partially successful, since the reaction requires the diffusion of the polymer molecules into the pores of the catalyst, where the active nickel metal is present. This is a slow process when hydrogenating polymers.

Discovery of nickel octoate/triethyl aluminum hydrogenation catalyst systems enabled rapid hydrogenation of polymers. These processes utilize the catalyst as a colloidal suspension in polymer containing solutions. This type of catalyst is referred to as a homogeneous catalyst. Such a process has been used for a number of years to prepare hydrogenated butadiene-styrene polymers that are used as viscosity index improvers in premium motor oils. U.S. Pat. No. 3,554,991 describes an exemplary process. Besides nickel, Group VIII metals in general will function as the active metal in these systems, and in particular, iron, cobalt, and palladium are known to be acceptable.

Pore diffusion is not a limitation when homogeneous catalysts are utilized. The hydrogenation process is rapid and complete in a matter of minutes. However, removal of the catalyst from the polymer product is necessary because metals, particularly nickel, which remain with the polymer catalyze degradation of the polymer product. The removal of the catalyst from the polymer solution is commonly accomplished by the addition of an ammonium phosphate-water solution and air to oxidize the nickel to a divalent state. The mixed nickel-aluminum phosphate can then be removed from the hydrogenated polymer solution by filtration.

Alternative methods to remove hydrogenation catalyst residues from solutions of hydrogenated polymers include treatment with dicarboxylic acid and an oxidant, as disclosed in U.S. Pat. No. 4,595,749; treatment with an amine compound wherein the amine is either a chloride salt or a diamine having an alkyl group of 1 to 12 carbon atoms as disclosed by U.S. Pat. No. 4,098,991; and treatment with a non-aqueous acid followed by neutralization with an anhydrous base and filtration, as disclosed by U.S. Pat. No. 4,028,485. These processes involve contacting the polymer solution with compounds which contaminate the polymer. Further process steps can be required to remove these contaminants. U.S. Pat. Nos. 4,278,506 and 4,471,099 describe processes to remove such contaminants from hydrogenated polymer solutions. Some of these catalyst removal systems are undesirable because those processes require relatively expensive metallurgy due to the corrosive nature of the compounds. Many also require the consumption of a continuous stream of reactants, and produce a sludge containing the catalyst and residues of the treatment chemicals.

It is therefore an object of this invention to provide a process to remove Group VIII metal containing hydrogenation catalyst residue from polymer solutions. It is a further object of this invention to provide a process to remove hydrogenation catalyst residue from polymer solutions which does not require the treatment of the polymer solution with phosphate compounds. In another aspect, it is an object of this invention to provide a process which is capable of removing hydrogenation catalyst residue from polymer solutions to a level of 5 ppm or less of Group VIII metal based on the solution. It is a further object to provide such a process which does not introduce a soluble contaminant into the polymer solution.

SUMMARY OF THE INVENTION

The objects of this invention are accomplished by a process comprising the steps of contacting a Group VIII metal hydrogenation catalyst residue containing polymer solution with a chelating resin, the chelating resin comprising iminodiacetate ions, and recovering a polymer solution comprising less than 5 ppm by weight, based on the solution, of the Group VIII metal. In a preferred embodiment, the chelating resin is contacted with the hydrogenation catalyst residue containing polymer solution by contacting particles of the chelating resin with the hydrogenation catalyst residue containing polymer solution under agitation, and the polymer solution containing less than 5 ppm of Group VIII metal is recovered by filtration from the chelating resin and resulting precipitated catalyst particles. This chelating agent has been unexpectedly found to promote the agglomeration and precipitation of the hydrogenation catalyst residues to particles which can be readily separated from the polymer solution. Further, being a physically separable solid, the chelating resin of the present invention does not contaminate the polymer or require a purification step in the polymer production process other than a physical separator.

DETAILED DESCRIPTION OF THE INVENTION

The chelating resin of the present invention comprises iminodiacetate ions which act as chelating groups in binding metal ions. These resins are typically utilized in ion exchange processes such as demineralization of boiler feed waters, removal of heavy metals from waste waters and purification of water by removal of metal ions. These chelating resins selectively react with certain metal ions, particularly divalent metal ions. The resins are then regenerated by washing with a concentrated aqueous solution of an acid such as HCl and then rinsing with water. These chelating resins may also react with the metal ions along with acting as a promoter for the agglomeration of the catalyst residue particles. Regeneration and recovery of the resins are therefore optionally included in the processes of the present invention.

A preferred chelating resin comprises iminodiacetate ions supported on a styrene-divinylbenzene copolymer. Such chelating resins may be obtained from Bio-Rad Laboratories of Richmond, Calif. under the trade names of Chelex 20 and Chelex 100. These products vary only by particle size, Chelex 20 is available in a 20–50 mesh size and Chelex 100 is available in sizes ranging from 50 mesh to less than 900 mesh. An alternative styrene-divinyl benzene supported iminodiacete ion containing chelating resin is Amberlite IRC-718, available from Rohm and Haas, Philadelphia, Pa.

The polymer solutions of the present invention preferably comprise from 1 to about 40 percent by weight of a polymer, and more preferably comprise from about 2 to about 20 percent by weight of polymer based on the total amount of solution. The polymer is a partially, selectively, or totally hydrogenated polymer. The present invention does not depend upon the type of nature of the polymer. The polymer may therefore be a thermoplastic polymer, or an elastomeric polymer and may have a molecular weight which varies between wide limits. Most typically, polymers which are benefited by hydrogenation are those comprising polymerized conjugated diolefins. These conjugated diolefin containing polymers are therefore preferred for the practice of the present invention. They may be prepared by radical, anionic or cationic polymerization and may be copolymers with other monomer units. The copolymers may be random, block, or tapered, and may have structures that are linear, branched, radial, or star.

In a most preferred embodiment, the polymer is an anionically polymerized conjugated diolefin polymer which was anionically polymerized in an inert solvent, and then hydrogenated in the same solvent to form the hydrogenation catalyst residue containing polymer solution.

When an anionic initiator is used, polymers will be prepared by contacting the monomers with an organoalkali metal compound in a suitable solvent at a temperature within the range from about −100° C. to about 300°, preferably at a temperature within the range from about 0° C. to about 100° C. Particularly effective polymerization initiators are organolithium compounds having the general formula:

$RLi_n$

Wherein:
R is an aliphatic, cycloaliphatic or aromatic hydrocarbon radical having from one to about 20 carbon atoms; and n is an integer from 1 to 4.

When the polymer is a block copolymer, the copolymer is preferably a styrene-conjugated diolefin block copolymer. This is due to the thermoplastic and elastomeric nature of these polymers. The polystyrene, being incompatible with the poly(conjugated olefins), form separate domains, and these domains have relatively high glass transition temperatures. Above the glass transition temperatures of the polystyrene domains the polymer is in a melt and can be molded, extruded or blended with other components. Below the glass transition temperature of the polystyrene, the hard polystyrene domains act as physical crosslinks between the rubbery polyconjugated diolefin chains. This results in excellent elastomer properties.

The polymer of the present invention is contacted with hydrogenation catalyst and hydrogen in a solution with an inert solvent such as cyclohexane, normal hexane, diethyl ether, toluene or benzene. The hydrogenation catalysts themselves have complex structures which are not well understood and are therefore usually described by the process used to prepare them. The hydrogenation catalyst can be prepared by combining a Group VIII metal carboxylate or alkoxide ("catalyst") with an alkyl or hydride of a metal selected from Groups I-A, II-A and III-B of Medeleev's Periodic Table of Elements ("cocatalyst"). The preparation of such catalysts is taught in U.S. Pat. Nos. 3,591,064 and 4,028,485, which are incorporated herein by reference.

Typically, between about 0.09 and about 10 mmoles of Group VIII metal is utilized per 100 grams of polymer to be hydrogenated. This corresponds to about 0.1 to 13 mmoles of Group VIII metal per liter of solution.

The catalyst metals which are preferred include iron, cobalt, nickel and palladium. Nickel and cobalt are particularly preferred. Iron is not particularly preferred because it is less active than the others, and palladium is not particularly preferred because it is more expensive than nickel and cobalt.

Lithium, magnesium and aluminum are preferred cocatalysts due to the excellent activity of the catalyst-catalyst systems which comprise those cocatalysts.

The hydrogenation catalysts are insoluble in the polymer solutions, and form a colloidal suspension. The chelating resin may react with a portion of the Group VIII metal ions, and remove the hydrogenation catalyst by this covalent attachment, but the chelating resin also promotes the agglomeration of the colloidal particles into particles which are capable of being separated from the polymer solution by conventional means.

The hydrogenation catalyst residue containing polymer solution is contacted with the chelating resin either in a continuous process or in a batch process. The resin may be in a fixed bed with the polymer solution passing through the fixed bed or the resin may be agitated with the polymer solution and then separated.

The treated polymer solution may be recovered from the chelating resin-polymer solution mixture by any known means to separate solids from viscous liquids. Centrifugal means such as centrifuges or cyclones may be utilized. Filtering, preferably in the presence of a filter aid may also be utilized, along with gravity settlement such as decantation, or sedimentation in parallel plate separators. Filtering utilizing a filter aid is preferred because this method is known to be effective to separate fine particles from polymer solutions.

An oxidation agent, such as molecular oxygen or a peroxide, may optionally be present when the polymer solution is contacted with the chelating agent. Oxidation agents increase the valence of the hydrogenation catalyst metals which, under some circumstances, enhances the agglomeration and precipitation of the catalyst particles.

EXAMPLE

A polystyrene-isoprene block copolymer 97,600 molecular weight was made by anionic polymerization using sec-butyl lithium as the initiator. The polymerization was accomplished in cyclohexane at about 65° C. Methanol was then added to terminate the polymerization. The resulting polymer solution contained 15% polymer by weight.

This polymer solution was then hydrogenated by adding about 100 ppm by weight, based on total solution, nickel as nickel 2-ethylhexanoate/triethylaluminum catalyst in cyclohexane. The polymer solution was held in a reactor at about 70° C. and 700 psig hydrogen pressure for over 60 minutes. The solution was then held at about 90° C. under 700 psig hydrogen partial pressure for about 25 additional minutes. Greater than 95% of the original ethylenic unsaturation was hydrogenated. Due to the cyclohexane dilution, the resulting polymer solution contained 11% polymer by weight.

The polymer solution was further diluted with cyclohexane to 5.5% polymer by weight. No special oxidation methods were employed, but the solution was exposed to air while being transferred to bottles used in the experiment. Amberlite IRC-718 resin, a chelating cation exchange resin in which an iminodiacetic acid functionality is bonded to a macroreticular matrix, was then added to the hydrogenated polystyrene-polyisoprene block copolymer solutions at weight ratios of 10:1, 50:1 or 150:1 of solution to Amberlite IRC-718. The bottles were rolled for 3 days and the samples were allowed to gravity settle overnight. Black solids precipitated from the polymer solution separate from the resin solids. The resulting nickel concentrations were measured on the clear hydrocarbon phase:

| Polymer Solution: Amberlite Ratio | Nickel in Solution, ppm |
| --- | --- |
| 10:1 | 3 |
| 50:1 | 1 |
| 150:1 | 2 |

This example demonstrates the usefulness of iminodiacetic ion containing resins as an agent to initiate precipitation of Group VIII metal containing polymer solutions.

We claim:

1. A process to remove Group VIII metal containing hydrogenation catalyst residue from a hydrogenated polymer solution comprising the steps of:
   a) contacting a Group VIII metal hydrogenation catalyst residue containing polymer solution with a chelating resin, the chelating resin containing iminodiacetate ions;
   b) allowing the hydrogenation catalyst residue to agglomerate and precipitate; and
   c) recovering a polymer solution comprising less than 5 ppm by weight, based on the solution, of the hydrogenation catalyst residue metals by separation of the chelating resin and precipitated catalyst particles from said polymer solution.

2. The process of claim 1 wherein the hydrogenation catalyst was prepared by combining a Group VIII metal carboxylate or alkoxide with an alkyl or hydride of a metal selected from Groups I-A, II-A and III-B of Medeleev's Periodic Table of Elements.

3. The process of claim 1 wherein the hydrogenation catalyst is prepared by combining a component selected from the group consisting of nickel carboxylate, nickel alkoxide, cobalt carboxylate, iron alkoxide, palladium carboxylate and palladium alkoxide with a component selected from the group consisting of lithium alkyl, lithium hydride, magnesium alkyl, magnesium hydride, aluminum alkyl and aluminum hydride.

4. The process of claim 1 wherein the hydrogenation catalyst is prepared by combining nickel 2-ethylhexanoate and an aluminum alkyl.

5. The process of claim 4 wherein the aluminum alkyl is triethylaluminum.

6. The process of claim 1 wherein the chelating resin is a styrene divinylbenzene copolymer containing iminodiacetate ions.

7. The process of claim 1 wherein the chelating resin is Amberlite IRC-718.

8. The process of claim 1 wherein the chelating resin is a Chelex resin.

9. The process of claim 1 wherein the hydrogenation catalyst residue is in the form of a colloidal suspension.

10. The process of claim 1 wherein the polymer solution comprises from about 1 to about 40 percent by weight polymer based on the total polymer solution, in an inert solvent.

11. The process of claim 10 wherein the inert solvent is selected from the group comprising cyclohexane, toluene, hexane, diethyl ether and benzene.

12. The process of claim 1 wherein the polymer is a hydrogenated polymer comprising conjugated diolefin monomer units.

13. The process of claim 12 wherein the polymer is a copolymer comprising monomer units of a conjugated diolefin and styrene.

14. The process of claim 13 wherein the copolymer is a block copolymer comprising at least one block which comprises monomer units of conjugated diolefins and at least one block which comprises styrene monomer units.

15. The process of claim 10 wherein the polymer is anionically polymerized in the inert solvent prior to hydrogenation of the polymer.

16. The process of claim 1 further comprising the step of contacting the hydrogenation catalyst residue containing polymer solution with an oxidation agent before the polymer solution is contacted with the chelating resin.

17. The process of claim 16 wherein the oxidation agent is oxygen.

18. The process of claim 17 wherein the oxygen is contacted with the hydrogenation catalyst residue containing polymer solution by sparging a gas stream comprising oxygen through the polymer solution.

19. The process of claim 18 wherein the gas stream comprises a major portion of nitrogen and a minor portion of oxygen.

20. The process of claim 18 wherein the gas is air.

21. The process of claim 16 wherein the oxidation agent is a peroxide.

22. The process of claim 1 wherein an oxidizing agent is contacted with the catalyst residue containing polymer solution when the polymer solution is contacting the chelating resin.

23. The process of claim 22 wherein the oxidizing agent is a peroxide.

24. The process of claim 1 wherein the polymer solution comprising less than 5 ppm of the Group VIII metal is recovered by filtration.

25. The process of claim 24 wherein the filtration is performed utilizing a filter aid.

26. The process of claim 1 wherein the polymer solution comprising less than 5 ppm of the Group VIII metal is recovered by gravity settlement.

27. The process of claim 1 wherein the polymer solution comprising less than 5 ppm of the Group VIII metal is recovered by centrifugation.

* * * * *